(12) United States Patent
Fuchs et al.

(10) Patent No.: US 9,514,469 B2
(45) Date of Patent: Dec. 6, 2016

(54) IDENTIFICATION OF CONSUMERS BASED ON A UNIQUE DEVICE ID

(71) Applicant: International Business Machines Corporation, Armonk, NY (US)

(72) Inventors: Omri Fuchs, Ramat Gan (IL); Sima Nadler, Kochav Yair (IL); Tommy Sandbank, Herzliyya (IL)

(73) Assignee: International Business Machines Corporation, Armonk, NY (US)

( * ) Notice: Subject to any disclaimer, the term of this patent is extended or adjusted under 35 U.S.C. 154(b) by 142 days.

(21) Appl. No.: 13/867,082

(22) Filed: Apr. 21, 2013

(65) Prior Publication Data

US 2014/0317266 A1    Oct. 23, 2014

(51) Int. Cl.
- *G06F 15/173* (2006.01)
- *G06Q 30/02* (2012.01)
- *G06F 17/30* (2006.01)

(52) U.S. Cl.
CPC ......... *G06Q 30/02* (2013.01); *G06F 17/30002* (2013.01); *G06F 17/30879* (2013.01)

(58) Field of Classification Search
CPC ................... G06F 17/30002; G06F 17/30879; H04L 29/08072
USPC ........................................ 705/26.61; 709/224
See application file for complete search history.

(56) References Cited

U.S. PATENT DOCUMENTS

| | | | |
|---|---|---|---|
| 7,353,032 B2 | 4/2008 | Ogino et al. | |
| 7,658,327 B2 | 2/2010 | Tuchman et al. | |
| 7,730,120 B2 | 6/2010 | Singh et al. | |
| 7,890,118 B2 | 2/2011 | Uta et al. | |
| 7,962,361 B2 | 6/2011 | Ramchandani et al. | |
| 2003/0195812 A1 | 10/2003 | Nguyen | |
| 2006/0019679 A1 | 1/2006 | Rappaport et al. | |
| 2008/0059297 A1 | 3/2008 | Vallier et al. | |
| 2010/0205045 A1 | 8/2010 | Zhang et al. | |

(Continued)

FOREIGN PATENT DOCUMENTS

| | | | |
|---|---|---|---|
| CN | 104112218 A | 10/2014 | |
| CN | 104113910 A | 10/2014 | |
| JP | 2003216711 A | 7/2003 | |

OTHER PUBLICATIONS

Huntington Guy, "Mobile Customers—Retail's New Age", http://www.authenticationworld.com/Papers/Mobile_Customers_-_Retails_New_Age.pdf.

(Continued)

*Primary Examiner* — Hitesh Patel
(74) *Attorney, Agent, or Firm* — Suzanne Frez; Jason H. Sosa; Willaim H. Hartwell (57) ABSTRACT

Machines, systems and methods for identification of a consumer are provided. The method comprises capturing a unique identifier (ID) associated with a computing device, wherein the computing device is configured to access content stored on one or more content servers; and associating the unique ID with tracking data associated with the computing device, wherein when the computing device submits a request to a content server to access content, wherein in response to retrieving at least one of the unique ID or the tracking data of the computing device, the computing device is identified and content pages accessed by the computing device are tracked by a machine that is aware of the association between the unique ID and the tracking data for the computing device.

17 Claims, 6 Drawing Sheets

(56) References Cited

U.S. PATENT DOCUMENTS

| | | | |
|---|---|---|---|
| 2011/0054920 A1 | 3/2011 | Phillips et al. | |
| 2011/0314114 A1 | 12/2011 | Young, III et al. | |
| 2012/0016733 A1* | 1/2012 | Belvin et al. | 705/14.41 |
| 2012/0046045 A1 | 2/2012 | Gupta et al. | |
| 2012/0058775 A1 | 3/2012 | Dupray et al. | |
| 2012/0209686 A1 | 8/2012 | Horowitz et al. | |
| 2012/0209781 A1 | 8/2012 | Michaelis et al. | |
| 2013/0143590 A1 | 6/2013 | Sridhara et al. | |
| 2013/0193201 A1* | 8/2013 | Bradley et al. | 235/375 |
| 2013/0288704 A1 | 10/2013 | Wirola et al. | |
| 2014/0108108 A1* | 4/2014 | Artman et al. | 705/14.1 |
| 2014/0188998 A1* | 7/2014 | Leonard et al. | 709/204 |
| 2014/0315569 A1 | 10/2014 | Feigenblat et al. | |
| 2014/0316848 A1* | 10/2014 | Fuchs | G06Q 30/02 705/7.29 |
| 2014/0317266 A1* | 10/2014 | Fuchs | G06Q 30/02 709/224 |
| 2015/0032567 A1* | 1/2015 | Bhatia | 705/26.8 |

OTHER PUBLICATIONS

Adobe, "Insight for Retail-Rapid Business Decisions for Retail", http://www.omniture.com/en/products/multi-channel-analytics/insight-retail.

Matthews, Christopher; "Future of Retail: How Companies Can Employ Big Data to Create a Better Shopping Experience"; Business, Time; Aug. 31, 2012; Printed on: Apr. 16, 2015; 4 pages; <http://business.time.com/2012/08/31/future-of-retail-how-companies-can-employ-big-data-to-create-a-better-shopping-experience/>.

Teltzrow et al.; "Consumer Behaviour at Multi-Channel Retailers"; Institute of Information Systems, Humboldt-University Berlin; 2003; pp. 1-13.

"Integrated digital marketing platform Adobe Marketing Cloud". [online][retrieved on Jun. 10, 2015]. <http://www.adobe.com/marketing-cloud.html>.

"Google's Retail Experiment With In-Store Location Is Encouraging, But Needs Much More Fine-Tuning"; FierceRetailIT; Nov. 30, 2011; p. 1-4; <http://www.fierceretail.com/retailit/story/googles-retail-experiment-with-in-store-location-is-encouraging-but-needs-much-more-fine-tuning>.

"Nearbuy Systems and Motorola In-Store Mobile Commerce Solutions", Motorola; 2011; 4 pages; © 2011, Motorola Solutions, Inc.; <https://www.yumpu.com/en/document/view/38056800/nearbuy-systems-and-motorola-in-store-mobile-commerce-solutions>.

* cited by examiner

IDENTIFICATION OF CONSUMERS BASED ON A UNIQUE DEVICE ID

CROSS-REFERENCE TO RELATED APPLICATIONS

The present application is related to U.S. application Ser. No. 13/867,081 filed on Apr. 21, 2013, and U.S. application Ser. No. 13/867,081, filed on Apr. 21, 2013. The content of both of the above-noted applications is incorporated herein by reference in entirety.

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to consumer identification and, more particularly, to a system and method for tracking consumer activity based on a unique identifier associated with a device used by the consumer to retrieve and view digital content.

BACKGROUND

Advertisers, retailers and businesses are interested in understanding consumer behavior. Consumers use multiple retail channels such as websites, call centers, mobile applications, and physical stores to research and purchase consumer goods, products and services. While browsing the web for such items, a consumer is typically unidentified, unless the consumer (1) has registered or established an account with a retailer and (2) makes the effort to login to the account prior to engaging in the browsing activity.

If a consumer cannot be identified with a certain degree of accuracy, cross-channel advertising and analytics as well as consumer profiling and pricing will have to rely on general statistical data and demographics gathered about a general crowd or audience to which the unidentified consumer may belong, in order to decide the type of content that should be presented to the unidentified consumer. This may result in unwanted content delivered to the consumer and also is not helpful in building an accurate profile for individual consumers.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one embodiment, machines, systems and methods for identification of a consumer are provided. The method comprises capturing a unique identifier (ID) associated with a computing device, wherein the computing device is configured to access content stored on one or more content servers; and associating the unique ID with tracking data associated with the computing device, wherein when the computing device submits a request to a content server to access content, wherein in response to retrieving at least one of the unique ID or the tracking data of the computing device, the computing device is identified and content pages accessed by the computing device are tracked by a machine that is aware of the association between the unique ID and the tracking data for the computing device.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
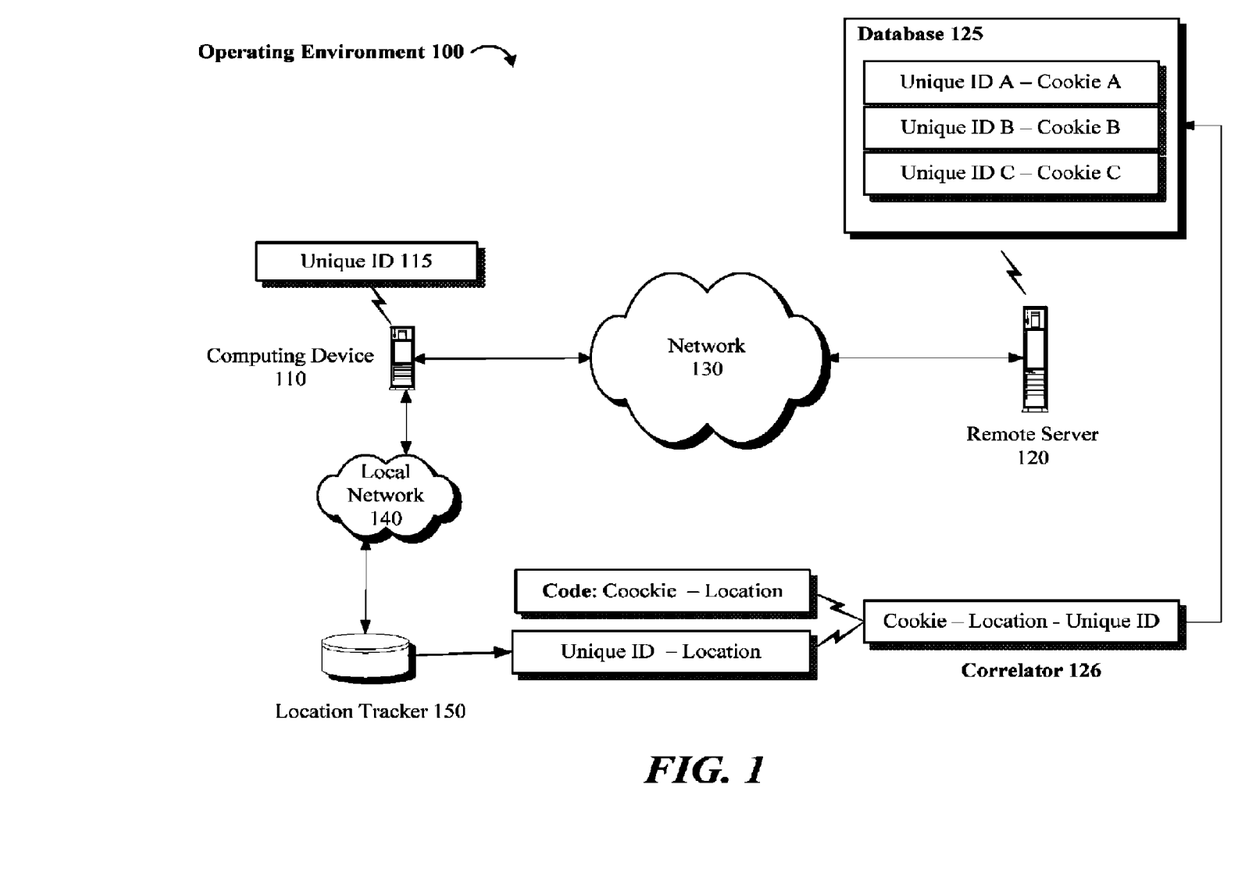
FIG. 1 illustrates an exemplary operating environment in accordance with one or more embodiments, wherein consumer activity may be tracked while browsing on-line or in a physical store.

Referring to FIG. 1, an exemplary operating environment 100 is illustrated in which a computing device 110 (e.g., a smart phone, a tablet, a computer, etc.) is carried by a consumer. Computing device 110 may connect and communicate with one or more remote servers 120 over a network 130 (e.g., the Internet). Computing device 110 is preferably or optionally a portable device that a consumer may carry to a physical retail location where goods may be physically purchased over the counter.

In accordance with one embodiment, it is desirable to build a database 125 (e.g., a lookup table) that includes a unique identifier 115 (unique ID) associated with the computing device 110 in correlation with a reference to a cookie also associated with computing device 110 and desirably with a user of computing device 110. Without limitation, the unique ID may be a Mac Address or other unique identifier associated with either computing device 110 or software running on computing device 110. Other examples of a unique ID include: MAC ID, Bluetooth ID, Radio-frequency identification (RFID) or the International Mobile Station Equipment Identity of communication chips installed on computing device 110 or the functional or structural equivalents of the same.

Depending on implementation, a cookie may include a set of data that may be used to track the identity or behavior of a consumer as the consumer views content (e.g., by visiting on one or more webpages). The browsing, querying and retrieval of the content may be performed by using a tool (e.g., browser software) installed on computing device 110. A cookie may be stored on computing device 110 when the consumer browses a webpage hosted by remote server 120, for example. The content of the cookie may be updated based on the consumer's browsing activity and or information provided by the consumer. A copy of the same cookie (or data that may be used to identify the cookie) may be also stored on a remote server 120 to track the webpages and content viewed.

In accordance with one embodiment, a scheme is implemented to establish a correlation between the unique ID 115 for computing device 110 and a cookie stored on server 120 (and optionally on computing device 110) as provided in further detail below. A direct correlation between the unique ID 115 and the cookie information helps identify the particular computing device 110 and by extension the consumer that uses the device. The identifying information, when provided to remote server 120 or an analytical engine (not shown), may help track the activities of the particular consumer both online and inside a physical store.

In one implementation, a designated software application (e.g., provided by a retailer) may be installed on computing device 110 to capture the unique ID 115 associated with computing device 110 and also to detect cookie data stored on computing device 110. The cookie data may be stored on computing device 110 when a consumer utilizes computing device 110 to browse webpages of a particular retailer. For example, a retailer may provide or require the designated software application (e.g., an App) to be installed on computing device 110 for a consumer to be able to register or access certain content available through the retailer's website.

Figure 2A:
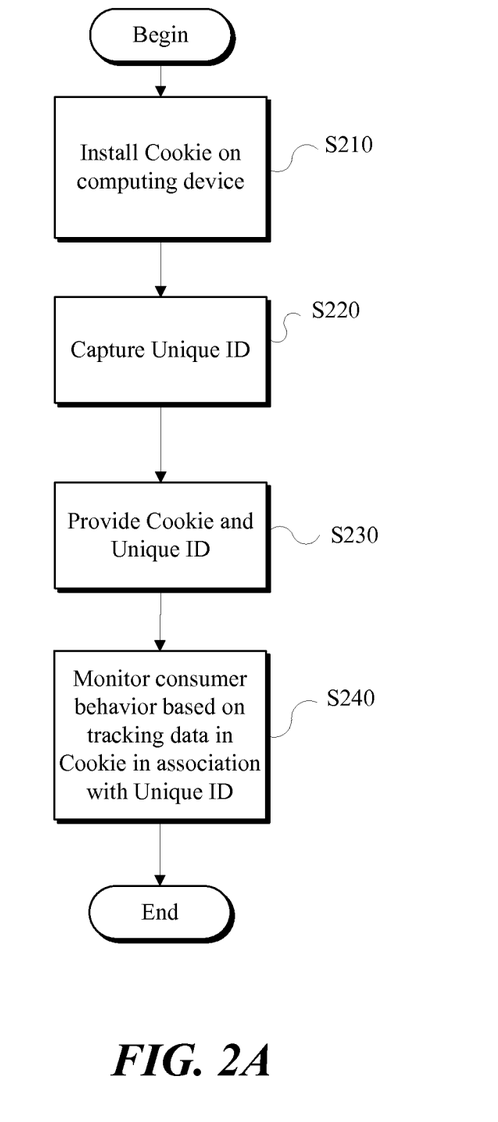
FIGS. 2A and 2B are exemplary flow diagrams of consumer identification methods, in accordance with one embodiment.

Referring to FIG. 2A, at the time of installation of the designated software application, or sometime thereafter, a tracking cookie may be installed on computing device 110 (S210). The designated software application is configured to capture the unique ID 115 associated with computing device 110 (S220). The designated software application may also be configured to collect cookie data stored on computing device 110. The unique ID 115 and the cookie data may be provided or reported by the designated software application to remote server 120 (S230). Server 120, in one implementation, records the unique ID in association with the cookie data in a data structure or a database 125. A consumer's activities may then be tracked based on the recorded association (S240).

Figure 2B:
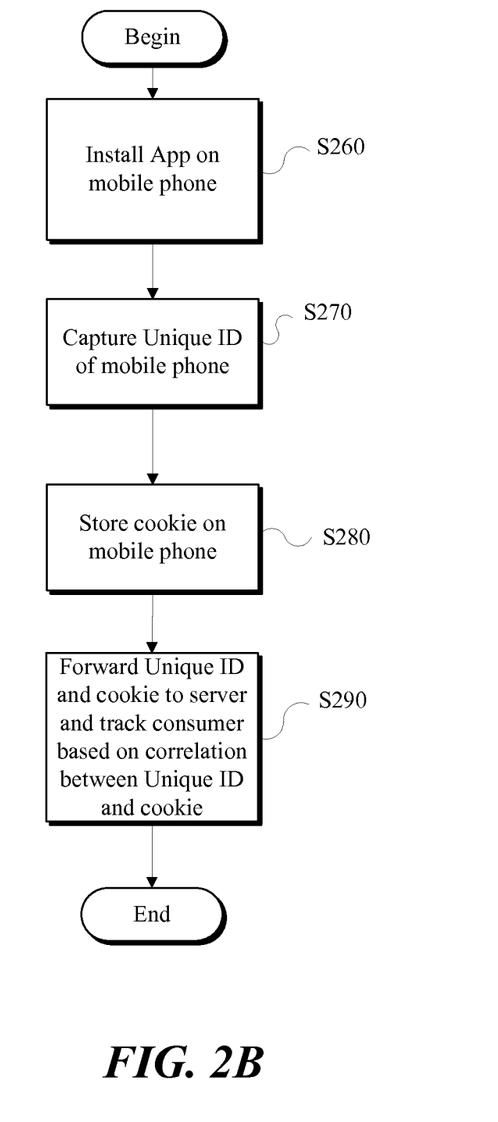

Referring to FIG. 2B, for example, in a retail setting, a consumer may download a retailer application or App to his mobile phone (S260). The App may be executed on the mobile phone to capture a unique ID of the mobile phone (S270). The App may invoke a web browser on the mobile phone with a link to the retailer's website and a cookie for the retailer's site may be generated and stored on the consumer's mobile phone (S280). The App may send the unique ID and the cookie to a server hosting the retailer's website. The unique ID and the cookie data may be stored by the server and correlated to track physical purchases and web browsing activities of the consumer as provided in further detail below (S290).

The unique ID 115 of computing device 110 in combination with the cookie data may be used to identify a unique consumer when he accesses the retailer's website, even if he is not logged in. Tracked consumer activity may include information about webpages visited, online purchases made, or in store activities of the consumer. For example, if the consumer uses a browser or an app installed on computing device 110 to view a webpage by way of submitting a request to server 120, but the request contains no cookie, server 120 presumes that this is the first time a page on a retailer's website is visited by the consumer. Server 120 and sends a cookie to be stored on computing device 110.

In one implementation, after a cookie is installed on computing device 110, the cookie is automatically sent by the browser to the server 120 every time new content (e.g., webpage) from a respective website is requested. Server 120 services the request and sends the requested content to computing device 120 and also stores the location of the requested webpage and optionally timing information associated with the request, along with the cookie in a log file, for example. By analyzing the log file, it is possible to determine the pages the consumer visited, the sequence, and length of the visit. A similar process may be applied to track activities of the consumer in a physical store by tracking the time spent in various locations in the store via the device 110's unique ID.

Referring back to FIG. 1, in one embodiment, computing device 110 is equipped with communication capabilities (e.g., a Wifi chip) to connect to a local network 140 available in a physical retail store, for example. Wifi is used herein as an example and is a communication technology utilized for establishing a wireless communication between a communication device and a local communication system (e.g., a Wifi adapter) that is connected to one or more remote servers. Once a device is connected to the local communication adapter, the device can then browse content available on the remote servers.

It is noteworthy that in other example embodiments, communication technologies (e.g., Bluetooth, WiMax, cellular, etc.) other than the Wifi technology may be utilized. As such, the scope of the claimed subject matter herein should not be construed as limited to the example Wifi setting disclosed here. In one implementation, if the Wifi capability of computing device 110 is turned on when a consumer enters the store with computing device 110, a location tracker 150 may be utilized to capture the device's unique ID 115 and location of computing device 110. Location tracker 150 may be equipment installed in the retail store and may be configured to capture unique ID 115 when the device 110 establishes a communication connection with the in-store Wifi adapter, for example.

Figure 3:
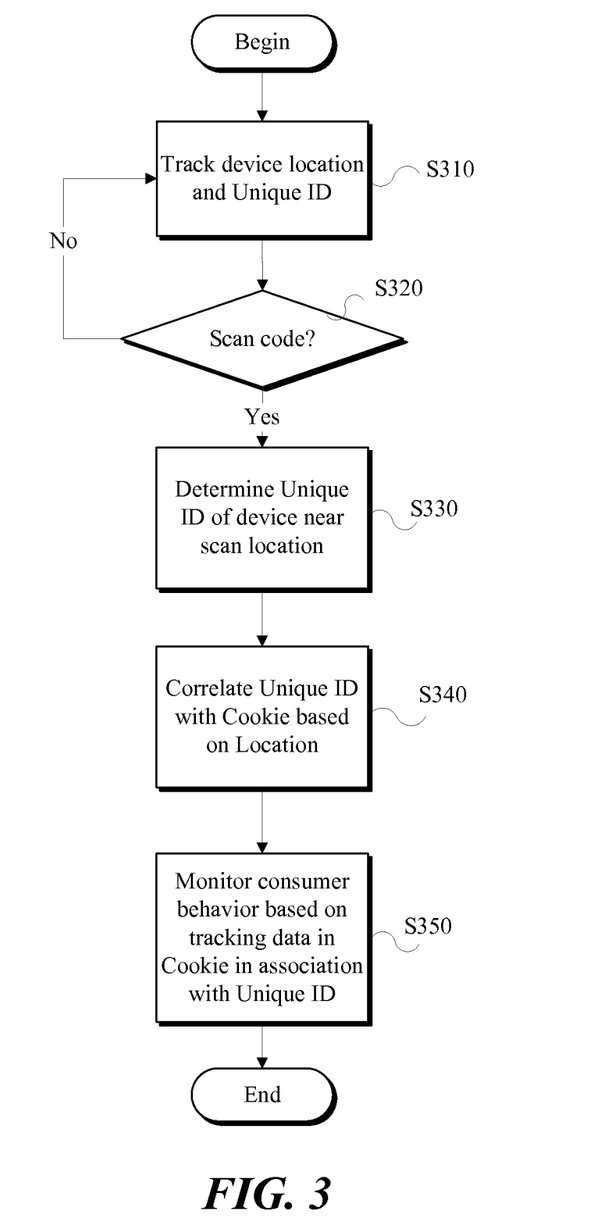
FIG. 3 is a flow diagram of another consumer identification method, in accordance with one embodiment.

Referring to FIGS. 1 and 3, in one example scenario, location tracker 150 may capture the unique ID associated with computing device 110 and track the location of the device in the physical store (S310), when the device establishes a Wifi connection with the in-store Wifi router, for example. The location tracker 150 may be configured to track the location of computing device 110 inside the store via tracker technology that may use the device's Wifi signal strength (e.g., received signal strength indicator (RSSI)) or other factors related to the number of frames transmitted by the device (e.g., the device's relative capture frame count (RCFC)) to track or approximately determine the location of the device inside the store.

Depending on implementation, the captured unique ID 115 and the location of computing device 110 may be periodically reported to server 120 or an analytical engine that monitors the location of the device in the store in association with the unique ID. In one example embodiment, when a code (e.g., a bar code or QR code) for a poster or merchandise is scanned by computing device 110 (S320), the location of the device is determine based on the location of the poster or merchandise in the store, assuming the scanned code includes the location information. Desirably or optionally, when the code is scanned, the computing device's browser is directed to the retail store's website which then causes a cookie to be stored on computing device 110.

In one aspect of the tracking system disclosed herein, the location information provided in the scanned code is associated with computing device 110 and by extension with the cookie information stored in the device. This association between the location and the cookie for computing device 110 may be stored in a database that is accessible by location tracker 150 or remote server 120 or a correlator 126. The correlator 126 may be a hardware or software component (or a combination of hardware and software components) that is included in location tracker 150 or server 120, for example.

In one embodiment, it is determined which computing device 110 was used in the store to scan the code. To accomplish this, location tracker 150 may be used to determine the unique ID 115 of the computing device 110 that scanned the code by identifying the devices that are within close proximity of the scan location (S330) as identified by the location information embedded in the scanned code. If a plurality of devices are in close proximity of the scanned location, then a disambiguation algorithm may be utilized to verify that the unique ID of the correct device is selected.

As shown in FIGS. 1 and 3, cookie data and the captured location information for computing device 110 may be reported to correlator 126. Location tracker 150 may capture the unique ID, the location and a timestamp associated with the computing device 110 for example. The cookie data may be captured by an app executed on the computing device 110 or may be captured by the remote server 120. Correlator 126 has access to unique ID 115 and the corresponding location information. Correlator 126 using the location information is able to correlate unique ID 115 and the cookie stored on computing device 110 (S340), since both the unique ID 115 and the cookie are associated with the same location information.

The association between the unique ID 115 and the cookie is provided to server 120 and that association is recorded in a database for future reference. Once the unique ID 115 and the cookie information for computing device 110 are known by server 120, any browsing activity by computing device 110, whether on over the web or in a physical store, may be captured and thus the on-line and in-store activities of the consumer, using computing device 110 may be tracked and analyzed based on either the unique ID or the cookie. In one implementation, once the pair (unique ID, cookie) has been established, having access to one of the two is sufficient to identify the unique user or device, even if the user has not logged in.

References in this specification to "an embodiment", "one embodiment", "one or more embodiments" or the like, mean that the particular element, feature, structure or characteristic being described is included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 4A:
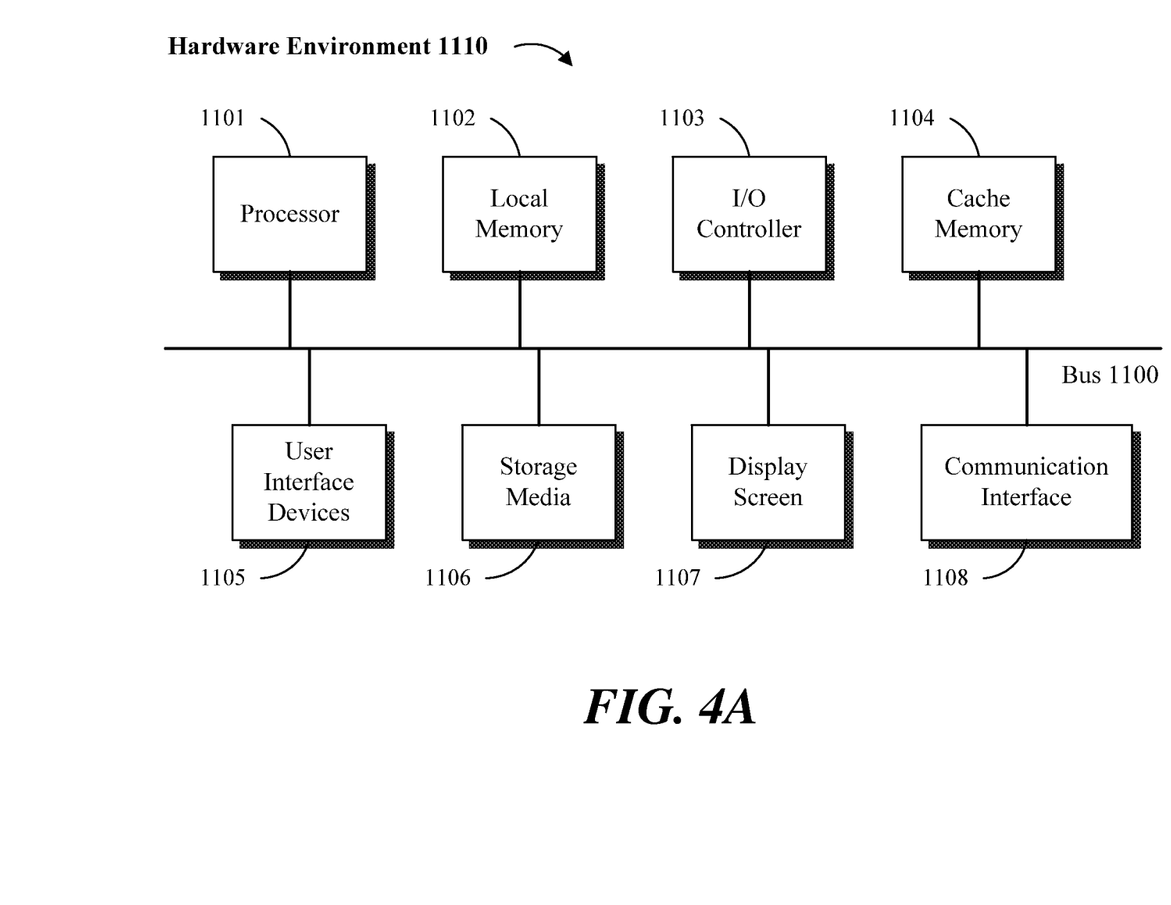
FIGS. 4A and 4B are block diagrams of hardware and software environments in which the disclosed systems and methods may operate, in accordance with one or more embodiments.
Figure 4B:
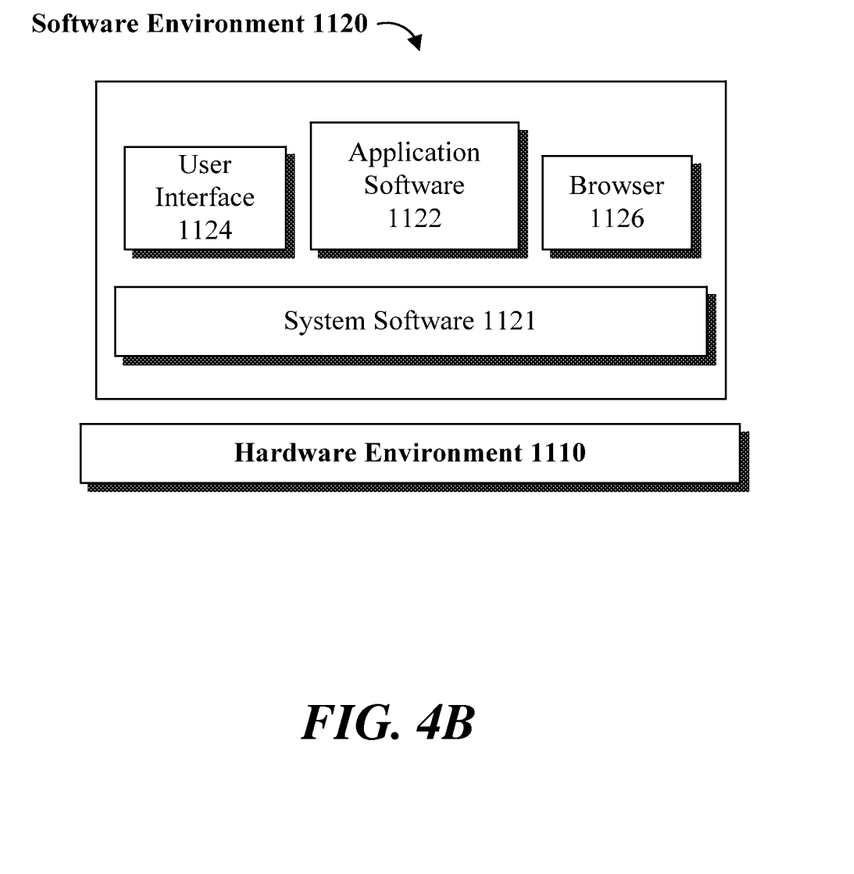

Referring to FIGS. 4A and 4B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 4A, the application software and logic code disclosed herein may be implemented in the form of machine readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other machine-usable or computer readable media. Within the context of this disclosure, a machine usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-Ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a machine such as a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a machine-usable or computer readable storage medium that provides program code for use by, or in connection with, a machine, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, micro-code, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations or block diagrams of methods, apparatus (systems) and computer program products according to embodiments. It will be understood that each block of the flowchart illustrations or block diagrams, and combinations of blocks in the flowchart illustrations and/or block diagrams, can be implemented by computer program instructions. These computer program instructions may be provided to a processor of a general purpose computer, a special purpose machinery, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer or machine implemented process such that the instructions which execute on the computer or other programmable apparatus provide processes for implementing the functions or acts specified in the flowchart or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures.

For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, may be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A method comprising:
for each computing device of a plurality of computing devices located in a first area, capturing a unique identifier associated with the respective computing device, wherein the computing device is configured to access content stored on one or more content servers;
receiving cookie data from a first computing device;
associating the received cookie data from the first computing device with the first computing device's respective unique identifier in a first record of a database located on a remote server;
receiving cookie data from a second computing device; and
associating the received cookie data from the second computing device with the second computing device's respective unique identifier in a second record of the database located on the remote server,
wherein when the first or second computing device submits a request to a content server to access content, and in response to retrieving at least one of the unique identifier or the cookie data of the respective computing device, the respective computing device is identified and content pages accessed by the computing device are tracked by a machine that is aware of the association between the unique identifier and the cookie data for the respective computing device, wherein the tracking of the respective computing device includes storing, in a respective log file, the respective computing device's cookie data, and further includes tracking time spent by the respective computing device in various locations in the first area and storing the time spent by the respective computing device in various locations in the first area in the respective log file,
wherein an application installed on the first or second computing device in response to the respective computing device scanning a code in a first location captures the unique identifier and causes the cookie data and the unique identifier to be stored on the remote server,
wherein the code includes location information about the first location, and wherein the location information is communicated to a location tracker, such that the location tracker identifies the respective computing device from among the plurality of computing devices located in the first area based on the location information.

2. The method of claim 1, wherein the unique identifier is captured and reported without requiring a registration process or login event being initiated by a user of the computing device.

3. A method for identifying a computing device, the method comprising:

for each computing device of a plurality of computing devices located in a first area, capturing a unique communication identifier broadcasted by the respective computing device, wherein the unique communication identifier is one of a MAC ID, a Bluetooth ID, a Radio-frequency identification (RFID) or an International Mobile Station Equipment Identity (IMSI) associated with the respective computing device;

tracking location of the plurality of computing devices in the first area, using a tracking mechanism, based on measuring a number of frames transmitted by each computing device of the plurality;

receiving location information about a first computing device, in response to the first computing device scanning a first code at a first location in the first area, wherein the scanned first code includes the location information about the first computing device;

receiving cookie data stored on the first computing device as a result of scanning the code;

determining which computing device of the plurality is the first computing device based on matching the location information received from scanning the code and the tracked location of the plurality of computing devices;

upon determining which computing device of the plurality is the first computing device, associating the received cookie data stored on the first computing device with the unique communication identifier of the first computing device in a first record of a database located on a remote server;

receiving location information about a second computing device of the plurality, in response to the second computing device scanning a second code at a second location in the first area, wherein the scanned second code includes the location information about the second computing device;

receiving cookie data stored on the second computing device as a result of scanning the second code;

determining which computing device of the plurality is the second computing device based on matching the location information received from scanning the second code and the tracked location of the plurality of computing devices;

upon determining which computing device of the plurality is the second computing device, associating the received cookie data with the unique communication identifier of the second computing device in a second record of the database located on the remote server; and tracking behavior of a first user associated with the first computing device and a second user associated with the second computing device based on the associations of their respective cookie data with their respective unique communication identifiers in their respective records of the database located on the remote server, wherein tracking behavior of the first user and the second user includes storing, in a respective log file for each user, the respective user's cookie data, and wherein tracking behavior of the first user and the second user further includes tracking time spent by each user in various locations in the first area and storing the time spent by each user in various locations in the first area in the respective log file for each user.

4. A system comprising:
one or more computer processors;
a computer readable storage device; and
program instructions stored on the computer readable storage device for execution by at least one of the one or more computer processors to cause the one or more computer processors to:

for each computing device of a plurality of computing devices located in a first area, capture a unique communication identifier broadcasted by the respective computing device, wherein the unique communication identifier is one of a MAC ID, a Bluetooth ID, a Radio-frequency identification (RFID) or an International Mobile Station Equipment Identity (IMSI) associated with the respective computing device;

track location of the plurality of computing devices in the first area, using a tracking mechanism, based on measuring a number of frames transmitted by each computing device of the plurality;

receive location information about a first computing device, in response to the first computing device scanning a first code at a first location in the first area, wherein the scanned first code includes the location information about the first computing device;

receive cookie data stored on the first computing device as a result of scanning the code;

determine which computing device of the plurality is the first computing device based on matching the location information received from scanning the code and the tracked location of the plurality of computing devices;

upon determining which computing device of the plurality is the first computing device, associate the received cookie data stored on the first computing device with the unique communication identifier of the first computing device in a first record of a database located on a remote server;

receive location information about a second computing device of the plurality, in response to the second computing device scanning a second code at a second location in the first area, wherein the scanned second code includes the location information about the second computing device;

receive cookie data stored on the second computing device as a result of scanning the second code;

determine which computing device of the plurality is the second computing device based on matching the location information received from scanning the second code and the tracked location of the plurality of computing devices;

upon determining which computing device of the plurality is the second computing device, associate the received cookie data with the unique communication identifier of the second computing device in a second record of the database located on the remote server; and track behavior of a first user associated with the first computing device and a second user associated with the second computing device based on the associations of their respective cookie data with their respective unique communication identifiers in their respective records of the database located on the remote server, wherein tracking behavior of the first user and the second user includes storing, in a respective log file for each user, the respective user's cookie data, and wherein tracking behavior of the first user and the second user further includes tracking time spent by each user in various locations in the first area and storing the time spent by each user in various locations in the first area in the respective log file for each user.

5. The system of claim 4, wherein the unique communication identifier is captured and reported without requiring a registration process or login event being initiated by a user of the computing device.

6. A computer program product comprising a computer readable storage device having a computer readable program, wherein the computer readable program when executed on a computer causes the computer to:
for each computing device of a plurality of computing devices located in a first area, capture a unique communication identifier broadcasted by the respective computing device, wherein the unique communication identifier is one of a MAC ID, a Bluetooth ID, a Radio-frequency identification (RFID) or an International Mobile Station Equipment Identity (IMSI) associated with the respective computing device;
track location of the plurality of computing devices in the first area, using a tracking mechanism, based on measuring a number of frames transmitted by each computing device of the plurality;
receive location information about a first computing device, in response to the first computing device scanning a first code at a first location in the first area, wherein the scanned first code includes the location information about the first computing device;
receive cookie data stored on the first computing device as a result of scanning the code;
determine which computing device of the plurality is the first computing device based on matching the location information received from scanning the code and the tracked location of the plurality of computing devices;
upon determining which computing device of the plurality is the first computing device, associate the received cookie data stored on the first computing device with the unique communication identifier of the first computing device in a first record of a database located on a remote server;
receive location information about a second computing device of the plurality, in response to the second computing device scanning a second code at a second location in the first area, wherein the scanned second code includes the location information about the second computing device;
receive cookie data stored on the second computing device as a result of scanning the second code;
determine which computing device of the plurality is the second computing device based on matching the location information received from scanning the second code and the tracked location of the plurality of computing devices;
upon determining which computing device of the plurality is the second computing device, associate the received cookie data with the unique communication identifier of the second computing device in a second record of the database located on the remote server; and
track behavior of a first user associated with the first computing device and a second user associated with the second computing device based on the associations of their respective cookie data with their respective unique communication identifiers in their respective records of the database located on the remote server, wherein tracking behavior of the first user and the second user includes storing, in a respective log file for each user, the respective user's cookie data, and wherein tracking behavior of the first user and the second user further includes tracking time spent by each user in various locations in the first area and storing the time spent by each user in various locations in the first area in the respective log file for each user.

7. The computer program product of claim 6, wherein the unique communication identifier is captured and reported without requiring a registration process or login event being initiated by a user of the computing device.

8. The method of claim 1, further comprising monitoring consumer behavior for a user of the computing device based on the associated unique identifier and cookie data.

9. The method of claim 8, wherein monitoring consumer behavior for the user of the computing device includes capturing browsing activity of the user, wherein the browsing activity includes both on-line activity and in-store activity.

10. The method of claim 3, further comprising monitoring consumer behavior for a user of the computing device based on the associated unique communication identifier and cookie data.

11. The method of claim 10, wherein monitoring consumer behavior for the user of the computing device includes capturing browsing activity of the user, wherein the browsing activity includes both on-line activity and in-store activity.

12. The system of claim 4, wherein the program instructions stored on the computer readable storage device for execution by at least one of the one or more computer processors further cause the one or more computer processors to monitor consumer behavior for a user of the computing device based on the associated unique communication identifier and cookie data.

13. The system of claim 12, wherein monitoring consumer behavior for the user of the computing device includes capturing browsing activity of the user, wherein the browsing activity includes both on-line activity and in-store activity.

14. The computer program product of claim 6, wherein the computer readable program when executed on a computer further causes the computer to monitor consumer behavior for a user of the computing device based on the associated unique communication identifier and cookie data.

15. The computer program product of claim 14, wherein monitoring consumer behavior for the user of the computing device includes capturing browsing activity of the user, wherein the browsing activity includes both on-line activity and in-store activity.

16. The method of claim 3, further comprising:
receiving updated cookie data stored on the first computing device, wherein the updated cookie data includes updated browsing activity of the first user and additional information provided by the first user; and
updating the first user's respective log file to reflect the updated cookie data.

17. The method of claim 3, wherein tracking behavior of the first user and the second user further includes tracking physical purchases made by each user and storing physical purchase information in the respective log file for each user.

* * * * *